Patented Oct. 20, 1925.

1,558,405

UNITED STATES PATENT OFFICE.

ARTHUR G. SMITH, OF OAK PARK, ILLINOIS.

DEODORANT COMPOSITION.

No Drawing. Application filed March 6, 1924. Serial No. 697,389.

*To all whom it may concern:*

Be it known that I, ARTHUR G. SMITH, a citizen of the United States, residing at Oak Park, in the county of Cook and State of Illinois, have invented a new and useful Improvement in Deodorant Compositions, of which the following is a specification.

The present invention relates to improvements in deodorant compositions, more particularly intended for application to the human body for the removal of odors and prevention of irritations resulting from perspiration and other secretions and discharges. It is an object of my invention to provide a composition having these properties in the form of a powder having high absorptive properties and capable of use by dusting or sprinkling on the various parts of the body.

In accordance with my invention I incorporate a finely powdered, non-poisonous soluble anti-acid body such as sodium bicarbonate, potassium bicarbonate, sodium or potassium carbonate, calcium hydroxide or the like, with an absorptive insoluble filler material of an emollient character, such as the stearate of zinc, aluminum or magnesium, or a mixture of talc and small proportions of zinc oxide. The use of the soluble anti-acid body of the character described tends to produce a drying action upon the skin, leading to chafing and irritation on repeated use. The emollient filler, in connection therewith, prevents effectively this chafing and irritation, both by lubricating the surfaces and by exerting a definite healing action thereupon. The proportion of the anti-acid material may suitably vary from 20 to 70 per cent, although proportions ranging from 30 to 50% are preferred.

I may also incorporate into the mixture suitable proportions, say 10 to 25%, of a mild healing astringent such as anhydrous calcium sulfate or the dihydrate of calcium sulfate.

The following compositions illustrate specific forms that may be taken by my invention. For example, I may employ a composition containing about 65% of sodium bicarbonate with 35% of talc preferably containing a small amount, say 1 to 5% of zinc oxide. In another composition which I have found highly effective in use, I incorporate 20 to 25% of sodium or potassium bicarbonate, 50% of talc and 25 to 30% of zinc stearate. Other desirable compositions, are first, 50% of sodium bicarbonate, 30% of talc and 20% of zinc stearate; second, 50% of sodium bicarbonate, 20% of talc, 20% of anhydrous calcium sulfate and 10% of zinc stearate.

The compositions prepared in accordance with my invention are characterized by their complete deodorizing action, by prompt removal of chafing or irritation where such has already occurred, and by the complete prevention of chafing or irritation where such conditions have not already arisen.

Although the invention has been described in connection with the details of specific compositions embodying the same, it is not intended that these details shall be regarded as limitations upon the scope of the invention except in so far as included in the accompanying claims.

I claim:

1. A deodorant composition in powdered form comprising sodium bicarbonate, zinc stearate and an inorganic emollient filler.

2. A deodorant composition in powdered form comprising a relatively major quantity of sodium bicarbonate, a relatively minor quantity of zinc stearate and a powdered inorganic filler of absorptive property.

3. A deodorant composition in powdered form comprising a major quantity of sodium bicarbonate, and minor quantities of anhydrous calcium sulfate and zinc stearate.

4. A deodorant composition in powdered form containing substantially 50% of sodium bicarbonate, 20% of talc, 20% of anhydrous calcium sulfate and 10% of zinc stearate.

5. A powdered deodorant composition comprising a soluble anti-acid constituent and a filler vehicle of emollient character affording protection against any irritant action of the anti-acid.

ARTHUR G. SMITH.